United States Patent [19]
Ziegler

[11] Patent Number: 4,657,348
[45] Date of Patent: Apr. 14, 1987

[54] ARRANGEMENT TO REMOVE REFLECTION FROM LIQUID CRYSTAL DISPLAYS (LCD'S)

[75] Inventor: Wolfgang Ziegler, Fürth, Fed. Rep. of Germany

[73] Assignee: Robert Bosch GmbH, Stuttgart, Fed. Rep. of Germany

[21] Appl. No.: 683,267
[22] PCT Filed: Dec. 24, 1983
[86] PCT No.: PCT/DE83/00218
§ 371 Date: Nov. 15, 1984
§ 102(e) Date: Nov. 15, 1984
[87] PCT Pub. No.: WO84/03778
PCT Pub. Date: Sep. 27, 1984

[30] Foreign Application Priority Data

Mar. 19, 1983 [DE] Fed. Rep. of Germany ....... 3309970

[51] Int. Cl.⁴ .............................................. G02F 1/13
[52] U.S. Cl. ................................... 350/347 R; 350/345
[58] Field of Search ...... 350/399, 337, 345, 276.5 LA, 350/276 R, 347 R

[56] References Cited

U.S. PATENT DOCUMENTS

| 2,819,459 | 5/1954 | Dodd | 350/399 X |
| 4,025,161 | 5/1977 | Laroche | 350/399 X |
| 4,196,973 | 4/1980 | Hochstrate | 350/345 X |

FOREIGN PATENT DOCUMENTS 0024482 3/1981 European Pat. Off. ............ 350/337

Primary Examiner—John K. Corbin
Assistant Examiner—David Lewis
Attorney, Agent, or Firm—Frishauf, Holtz, Goodman & Woodward

[57] ABSTRACT

An arrangement to remove reflection from liquid crystal displays is proposed. The arrangement includes a liquid crystal cell (11) and a cover disk (18) disposed obliquely thereto, spaced apart from and in front of the liquid crystal cell (11), the cover disk bearing a circular polarizer (19). In the front, a λ/4 retarding foil (16) is disposed on the liquid crystal cell (11), cooperating with the circular polarizer (19) in such a manner that a practically complete removal of reflection for the light passing through the cover disk (18) from outside takes place (FIG. 1).

5 Claims, 5 Drawing Figures

FIG. 1
FIG. 3
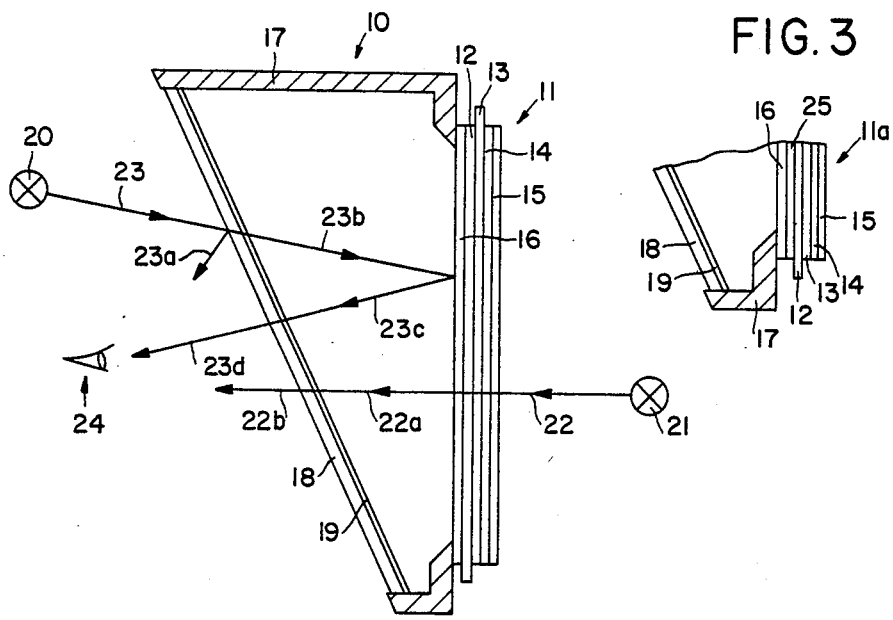
FIG. 2a
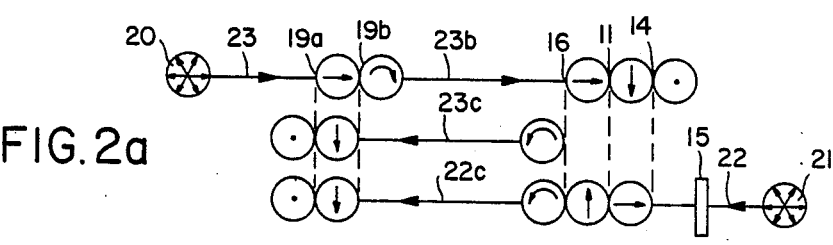
FIG. 2b
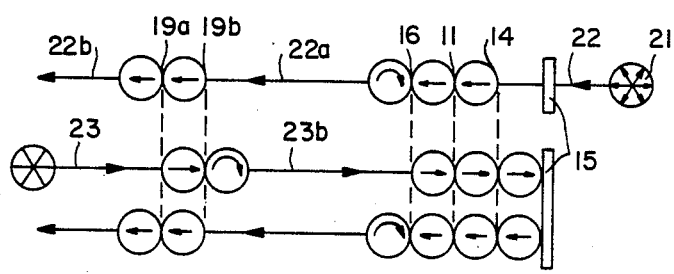
FIG. 4
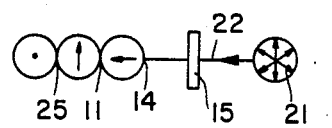

ARRANGEMENT TO REMOVE REFLECTION FROM LIQUID CRYSTAL DISPLAYS (LCD'S)

STATE OF THE ART

The invention relates to an arrangement to remove reflection from liquid crystal displays. A liquid crystal display is already known from German Patent Disclosure Document No. DE-OS 29 34 478, which for use in motor vehicles is partially freed from reflection. In the known arrangement, a cover disk having a polarizing filter is provided to remove reflection. By means of the oblique disposition of the cover disk, the light reaching the display from the outside is partially reflected, and the reflected component of the light is deflected downward. Another component of the light is absorbed by the polarizing filter. The remaining component, about 40%, however, reaches the liquid crystal cell, where it is partially reflected from the glass surface of the cell. When the incident light is at an unfavorable angle, this reflection makes the display unreadable.

From the above-cited publication, it is also known to glue an intermediate layer to the front of the liquid crystal cell and then to apply the polarizing filter in a curved shape to this layer. The cover disk is disposed spaced apart from and parallel to the liquid crystal cell. This arrangement has the disadvantage that it is difficult to master technically and that in large-scale displays it dictates a very high weight on the part of the display unit.

It has furthermore been proposed previously that the cover disk be provided with a circular polarizer, which cooperates with a polarizer disposed on the front of the liquid crystal cell and virtually completely prevents any reflection of the interfering light. This arrangement has the disadvantage, however, that even the light required for the display is for the most part absorbed at the circular polarizer of the cover disk as well. The brightness of the display is thereby impaired.

With the present arrangement, the goal is to prevent any reflection of the interfering light striking the display from the outside, without impairing the brightness of the display.

The arrangement according to the invention has the advantage that all the light striking the display from the front, after being reflected, is practically completely absorbed upon passing again through the circular polarizer, so that the display appears as a black surface, in which only the triggered display elements stand out visually, with clear contrast. The brightness of the display is no longer impaired by the circular polarizer on the cover disk.

It is particularly advantageous if a transflector is applied to the back of the liquid crystal display, behind the linear rear polarizer. In this case, the light required for the display can be installed behind the liquid crystal cell, and it passes through the liquid crystal cell only in the areas of the triggered display elements. Since the light striking the front of the liquid crystal cell in the vicinity of the triggered display elements is further reflected at the transflector, greater contract can be attained with this arrangement, because the light arriving from the front further increases the brightness of the display.

DRAWING

Two exemplary embodiments of the invention are shown in the drawing and described in detail below. Shown are:

FIG. 1, a liquid crystal display having a $\lambda/4$ retarding foil;

FIGS. 2a and 2b, the polarization of the light in the path of the rays, FIG. 2(a) when the liquid crystal display of FIG. 1 is not triggered and FIG. 2(b) when the display of FIG. 1 is triggered;

FIG. 3, a further exemplary embodiment of the invention; and

FIG. 4, the corresponding polarization of the light.

DESCRIPTION OF THE EXEMPLARY EMBODIMENTS

In FIG. 1, a liquid crystal display for a vehicle is identified as 10. It contains an LCD cell 11, in which the liquid crystal substance is enclosed in the conventional manner between two glass plates 12, 13 vapor-deposited with electrodes and with which the various parameters and data of the motor vehicle can be displayed. A linear polarizer 14 and, behind it, a transflector 15 are applied to the glass plate 13 at the rear of the LCD cell 11. A $\lambda/4$ retarding foil 16 is applied to the glass plate 12 with optical cement at the front of the LCD cell 11. The LCD cell 11 is secured in a cutout in the rear wall of a housing 17. A cover disk 18 is secured to the front of the housing 17, obliquely with respect to the LCD cell 11; the cover disk 18 has a circular polarizer 19 on its back. The interfering external light is represented in FIG. 1 by a lamp 20, while the light required for the display is represented by a further lamp 21 behind the LCD cell 11. While the ray emanating from this latter light source is indentified as 22, the ray of the interfering external light is identified as 23. The driver of the motor vehicle is symbolically represented by an eye 24 in front of the display 10.

In FIG. 2, the conversion of the light rays 22 and 23 in the vicinity of the display 10 is shown symbolically; FIG. 2a shows the polarization stages of light when the LCD cell element is not triggered, and FIG. 2b shows the polarization stages of the light when the LCD cell 11 is triggered. The light ray 23 of the interfering external light 20 first strikes the surface of the cover disk 18, at which a component 23a, amounting to approximately 5%, is reflected. By means of the inclination of the cover disk 18, it is assured that the reflected component 23a is reflected downward toward a dark area within the motor vehicle, so that it cannot be perceived by the driver 24. The non-reflected component passes through the cover disk 18 to strike the circular polarizer 19, which in a known manner comprises a linear polarizer 19a and a $\lambda/4$ retarding foil 19b. A component amounting to about 50% of the light is absorbed by the circular polarizer 19, and the remainder is converted into circular-polarized light. This component 23b now reaches the LCD cell 11. A portion of the light ray 23b is now converted by the $\lambda/4$ retarding foil 16 into linear-polarized light, which is rotated by 90° by the untriggered LCD cell 11 and absorbed by the rear polarizer 14. The remainder of the light 23b is reflected at the $\lambda/4$ retarding foil 16 and thereby circular-polarized in the opposite rotational direction. This reflected component 23c of the light 23 now strikes the back of the circular polarizer 19. There it is initially polarized by the $\lambda/4$ retarding foil 19b of this polarizer, and then practically completely absorbed by the linear polarizer 19a thereof, since its plane of polarization is rotated by 90° with respect to the plane of polarization of the light ray 23c. The light 23d still emerging from the cover disk 18, amounting to far less than 1%, is no longer perceptible.

The light ray 22 of the light souce 21 for the illumination of the LCD display 11 first passes through the transflector 15 to strike the linear polarizer 14. A portion of the light is absorbed here, while the remaining part is linear-polarized. The linear-polarized light is rotated by 90° in its direction of polarization as it passes through the LCD cell 11 and as its course continues it is converted into circular-polarized light by the λ/4 retarding foil 16. The direction of rotation of the plane of polarization and the further course of the light ray 22a corresponds to those of the ray 23c.

Now if certain display elements of the LCD cell 11 are triggered by applying a voltage to the electrodes, then in a known manner the liquid crystals of the LCD cell 11 are aligned in the triggered areas such that they no longer rotate the plane of polarization of linear-polarized light. As shown in FIG. 2b, the light 22 originating at the light source 21 behind the LCD cell 11 travels via the transflector 15 to the linear polarizer 14; there it is linear-polarized and now travels through the liquid crystal cell 11 to reach the λ/4 retarding foil 16. There, the light is circular-polarized, the circular polarization being in a direction of rotation along the direction of propagation as with the light ray 23b. The circular-polarized light 22a now reaches the circular polarizer 19 on the cover disk 18, where it is converted virtually without loss, via the λ/4 retarding foil 19b and the linear polarizer 19a, into linear-polarized light 22b, which emerges at the front at the cover disk 18 and is thus visible to the driver 24. The light 23 of the interfering light source 20 is converted—as already explained above—into circular-polarized light 23b by the circular polarizer 19 on the cover disk 18, partially reflected by the λ/4 retarding foil 16, and the reflected light, as noted, is absorbed by the circular polarizer 19. The nonreflected component, converted into linear-polarized light by the λ/4 retarding foil 16, is now allowed to pass through without rotation at the triggered area of the LCD cell 11 and reaches the transflector 15 via the correspondingly aligned linear polarizer 14. This component of the light is reflected here and in turn passes through the LCD cell 11 to reach the λ/4 retarding foil 16. Here the light is circular-polarized into the same direction of rotation as the light 22 of the light source 21. From there, it passes in the same manner through the circular polarizer 19 at the cover disk 18 and thus becomes visible to the driver 24. Since the nontriggered areas of the LCD cell 11 appear black to the driver 24, this arrangement results in good contrast for the display, which can be improved still further in accordance with the intensity of the external light 20. This is particularly advantageous, because as the brightness of the surroundings of the driver 24 increases, reading the display becomes more difficult because of the adaptive condition of the eyes.

In FIG. 3, a detail of a liquid crystal display in accordance with FIG. 1 is shown, but in which the λ/4 retarding foil 16 is disposed together with a linear-polarizing layer 25 at the front, in front of the front glass plate 12 of the LCD cell 11. The λ/4 retarding foil 16 and the linear-polarizing layer 25 here together form a circular polarizer, the linear-polarizing layer 25 being applied to the front surface of the glass plate 12 of the LCD cell 11 and the λ/4 retarding foil 16 facing the cover disk 18.

The plane of polarization of the linear-polarizing layer 25 must agree with that of the linear polarizer 14. In this case, the light of the ray 23 of the light source 20 in FIG. 1 takes the same course as is shown in FIG. 2. The light of the light source 20 that is reflected at the surface of the λ/4 retarding foil 16 is absorbed by the circular polarizer 19, as described above. The course of the ray of light of the light source 21, in the case of a triggered display segment, is also the same as that in the arrangement of FIG. 1 (see FIG. 2b). The course of the ray in the non-triggered state of the liquid crystal layer, contrarily, is explained in FIG. 4. The light of the light source 21 is linear-polarized by the linear polarizer 14. Upon passing through the liquid crystal cell 11, the plane of polarization of the light is rotated by 90°, and the light is thus absorbed by the front polarizer 25, which is disposed parallel to the polarizer 14.

The contrast of the display in this arrangement is greater than in the arrangement of FIG. 1, because the linear polarizer is virtually aselective and absorbs a very great percentage of the light passing through the liquid crystal cell 11 from the lamp 21 in the non-triggered state, while contrarily the λ/4 retarding foil is inherently dependent on wavelength and as a result the circular polarization of the light of the ray 22a, which is the criterion for this observation, is not assured completely. As a result, the absorption in the circular polarizer 19 is merely incomplete.

I claim:

1. Arrangement to remove reflection from liquid crystal displays (10) comprising
    a substantially planar liquid crystal cell (11, 11a);
    a cover disk (18) disposed spaced apart from, in front of, and at an oblique angle with respect to the plane of the liquid crystal cell (11, 11a);
    a circular polarizer (19) applied to a face of said cover disk closest to said liquid crystal cell (11,11a); and
    a λ/4 retarding foil (16) disposed on a front face of the liquid crystal cell (11, 11a) closest to said cover disk (18), said λ/4 retarding foil and said circular polarizer, cooperating to linearly polarize light which has passed through both the λ/4 retarding foil and the circular polarizer.

2. Arrangement according to claim 1, wherein
    said liquid crystal cell (11,11a) has a back side, remote from said cover disk (18);
    a linear polarizer (14) is disposed on said back side;
    a transflector (15) is disposed behind said linear polarizer (14); and
    a backlight (21) is provided, disposed behind said transflector (15), and illuminates triggered display elements.

3. Arrangement according to claim 1 or 2, characterized in that the λ/4 retarding foil (16) is applied together with a linear-polarizing layer (25), as a circular polarizer, to the front of the liquid crystal cell (11a).

4. Arrangement according to claim 3, characterized in that the linear-polarizing layer (25) is applied to the front surface of the liquid crystal cell (11a) and the λ/4 retarding foil (16) faces the cover disk (18).

5. Arrangement according to claim 1, wherein said circular polarizer (19) on said cover disk (18) comprises
    a linear polarizer (19a); and
    a λ/4 retarding foil (19b), said retarding foil (19b) being disposed between said linear polarizer (19a) and the retarding foil (16) on the front of said liquid crystal cell (11,11a).

* * * * *